US010671895B2

(12) United States Patent
Wang et al.

(10) Patent No.: US 10,671,895 B2
(45) Date of Patent: Jun. 2, 2020

(54) AUTOMATED SELECTION OF SUBJECTIVELY BEST IMAGE FRAMES FROM BURST CAPTURED IMAGE SEQUENCES

(71) Applicant: Microsoft Technology Licensing, LLC, Redmond, WA (US)

(72) Inventors: Baoyuan Wang, Redmond, WA (US); Sing Bing Kang, Redmond, WA (US); Joshua Bryan Weisberg, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 477 days.

(21) Appl. No.: 15/376,429

(22) Filed: Dec. 12, 2016

(65) Prior Publication Data

US 2018/0005077 A1 Jan. 4, 2018

Related U.S. Application Data

(60) Provisional application No. 62/357,298, filed on Jun. 30, 2016.

(51) Int. Cl.
*G06K 9/62* (2006.01)
*G06K 9/03* (2006.01)
(Continued)

(52) U.S. Cl.
CPC ............ *G06K 9/627* (2013.01); *G06K 9/036* (2013.01); *G06K 9/4642* (2013.01);
(Continued)

(58) Field of Classification Search
None
See application file for complete search history.

(56) References Cited

U.S. PATENT DOCUMENTS 8,131,786 B1 3/2012 Bengio et al.
8,724,917 B2 5/2014 Kwon
(Continued)

FOREIGN PATENT DOCUMENTS

EP 2661072 A1 11/2013
WO 2015121699 A1 8/2015

OTHER PUBLICATIONS

Chang, H.—"Automatic Triage for a Photo Series"—SIGGRAPH '16 Technical Paper, Jul. 2016, pp. 1-10 (Year: 2016).*

(Continued)

*Primary Examiner* — Bernard Krasnic
(74) *Attorney, Agent, or Firm* — Alleman Hall Creasman & Tuttle LLP

(57) ABSTRACT

A "Best of Burst Selector," or "BoB Selector," automatically selects a subjectively best image from a single set of images of a scene captured in a burst or continuous capture mode, captured as a video sequence, or captured as multiple images of the scene over any arbitrary period of time and any arbitrary timing between images. This set of images is referred to as a burst set. Selection of the subjectively best image is achieved in real-time by applying a machine-learned model to the burst set. The machine-learned model of the BoB Selector is trained to select one or more subjectively best images from the burst set in a way that closely emulates human selection based on subjective subtleties of human preferences. Images automatically selected by the BoB Selector are presented to a user or saved for further processing.

15 Claims, 6 Drawing Sheets

(51) Int. Cl.
   *H04N 5/232*   (2006.01)
   *H04N 5/235*   (2006.01)
   *G06K 9/46*    (2006.01)
   *G06F 16/2457* (2019.01)

(52) U.S. Cl.
   CPC ......... *G06K 9/6263* (2013.01); *G06K 9/6277* (2013.01); *H04N 5/2356* (2013.01); *H04N 5/23229* (2013.01); *G06F 16/24578* (2019.01); *G06K 2009/4666* (2013.01)

(56) References Cited

U.S. PATENT DOCUMENTS

| | | | |
|---|---|---|---|
| 8,736,697 | B2 | 5/2014 | Fintel et al. |
| 9,009,083 | B1 | 4/2015 | Shetty et al. |
| 2009/0263028 | A1 | 10/2009 | Kwon |
| 2011/0169987 | A1 | 7/2011 | Gann |
| 2012/0242851 | A1 | 9/2012 | Fintel et al. |
| 2013/0176458 | A1 | 7/2013 | Van Dalen et al. |
| 2013/0208127 | A1 | 8/2013 | Chou et al. |
| 2014/0184849 | A1 | 7/2014 | Kim |
| 2014/0354845 | A1 | 12/2014 | Molgaard et al. |
| 2015/0029349 | A1 | 1/2015 | Ben Israel et al. |
| 2015/0055854 | A1 | 2/2015 | Marchesotti |
| 2015/0071547 | A1 | 3/2015 | Keating et al. |
| 2016/0034786 | A1 | 2/2016 | Suri et al. |
| 2017/0039452 | A1* | 2/2017 | Osindero ................ G06F 16/50 |
| 2017/0344900 | A1* | 11/2017 | Alzahrani ............. G06N 20/00 |

OTHER PUBLICATIONS

Liu, et al., "Fast burst images denoising", In Journal of ACM Transactions on Graphics, vol. 33, Issue 6, Nov. 2014, 9 pages.

Tasli, et al., "Spot the differences: from a photograph burst to the single best picture", In Proceedings of the 21st ACM international conference on Multimedia, Oct. 21, 2013, pp. 729-732.

Li, et al., "Aesthetic Visual Quality Assessment of Paintings", In Journal of IEEE selected topics in Signal Processing, vol. 3, No. 2, Apr. 1, 2009, pp. 236-252.

"International Search Report and Written Opinion Issued in PCT Application No. PCT/US2017/039605", dated Oct. 12, 2017, 12 Pages. (MS# 360432-WO-PCT).

Soundararajan, et al., "Survey of information theory in visual quality assessment", In Journal of Signal, Image and Video Processing, vol. 7, No. 3, Mar. 17, 2013, pp. 391-401.

\* cited by examiner

AUTOMATED SELECTION OF SUBJECTIVELY BEST IMAGE FRAMES FROM BURST CAPTURED IMAGE SEQUENCES

CROSS-REFERENCE TO RELATED APPLICATIONS

This application claims the benefit under Title 35, U.S. Code, Section 119(e), of a previously filed U.S. Provisional Patent Application by Baoyuan Wang, et al., entitled "AUTOMATED SELECTION OF BEST SHOTS FROM BURST CAPTURED IMAGE SEQUENCES," Ser. No. 62/357,298, filed on Jun. 30, 2016.

BACKGROUND

Many cameras, including cell phone based cameras, feature burst or continuous high-speed image capture capabilities. In burst mode, the camera typically captures multiple image frames of a scene in quick succession, e.g., 10 frames per second of a particular scene for a short period, e.g., one second. The resulting burst captured images tend to be very similar, often with relatively subtle differences. However, even subtle differences between images can result in significant differences in subjective image quality.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Best of Burst Selector," or "BoB Selector," as described herein, provides various techniques for automatically selecting a subjectively best image from a set of images of a scene captured in a burst or continuous capture mode, captured as a video sequence, or captured as multiple images of the scene over any arbitrary period of time and any arbitrary timing between images. This set of images is referred to herein as a burst set. Selection of the subjectively best image from the burst set is achieved in real-time by applying a machine-learned model to the burst set. Images automatically selected by the BoB Selector are then presented to a user or saved for further processing.

In various implementations, the machine-learned model of the BoB Selector is trained to select a subjectively best image from the burst set in a way that closely emulates human selection based on subjective subtleties of human preferences. More specifically, in various implementations, the machine-learned model is trained on a large set of predefined or user-defined features that are automatically extracted from each image in each burst set in combination with selections of single best images (also referred to herein as a "favorite image") from each burst set via crowd-sourced or expert-based evaluations of large numbers of individual burst sets. In various implementations, the subjectively best images selected from each burst set via crowd-sourced or expert-based evaluations are annotated (e.g., hand-labeled annotation vectors or feature labels) by the person making the selection to include information relating to the image features or characteristics considered in selecting that subjectively best image.

More specifically, in various implementations, multiple human users or reviewers provide subjective choices or selections of a single subjectively best image (e.g., the favorite image of each human reviewer) from each of a large number of individual burst sets. The human reviewers may also rank two or more of the images in each burst set in terms of relative subjective quality. In addition, multiple features are automatically extracted from each of the images of each of those individual burst set. Examples of such features include, but are not limited to, low level features such as blur, noise, luminance, color, contrast, etc., mid-level features such as salient objects, "rule of thirds" analysis, depth of field, etc., semantic features such as facial expressions, interesting motions, personal taste, etc. The human selections, and optional human feature labels, are then provided in combination with the corresponding burst sets and the automatically extracted features to automatically train the machine-learned model. Advantageously, this training produces a machine-learned model, also referred to herein as a Best of Burst model, or simply a BoB model, that operates in real-time to closely emulate human subjective choices and selections of subjectively best images from arbitrary individual burst sets.

For example, in various implementations, the BoB Selector begins operation by receiving a burst set comprising a plurality of images of a scene captured via a burst mode of a burst-capable imaging device, captured as a video sequence, or captured as multiple images of the scene over any arbitrary period of time and any arbitrary timing between images. The BoB Selector then applies a machine-learned predictive best of burst model (e.g., the aforementioned BoB model) to rank each of the images in the burst set in terms of a predicted subjective goodness level. Next, in various implementations, the BoB Selector outputs one or more highest ranked images in the burst set as predicted subjectively best images. In various implementations, the BoB Selector then applies a global quality model to the remaining images in the burst set to produce a remainder set of images by excluding one or more images having a predicted quality below a quality threshold level. Next, in various implementations, the BoB Selector computes difference levels between the predicted subjectively best image and each of the images in the remainder set. Finally, the BoB Selector one or more of the highest ranked images in the remainder set having a difference level exceeding a difference threshold level with respect to the subjectively best image and that also exceed that difference threshold level with respect to any other already selected images of the remainder set.

The BoB Selector described herein provides various techniques that operate in real-time to closely emulate human subjective choices and selections of subjectively best images from arbitrary individual burst sets. In addition to the benefits described above, other advantages of the BoB Selector will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

FIG. 1 provides an exemplary architectural flow diagram that illustrates program modules for training a machine-learned "Best of Burst" (BoB) model of a "BoB Selector," as described herein.

DETAILED DESCRIPTION

Figure 1:
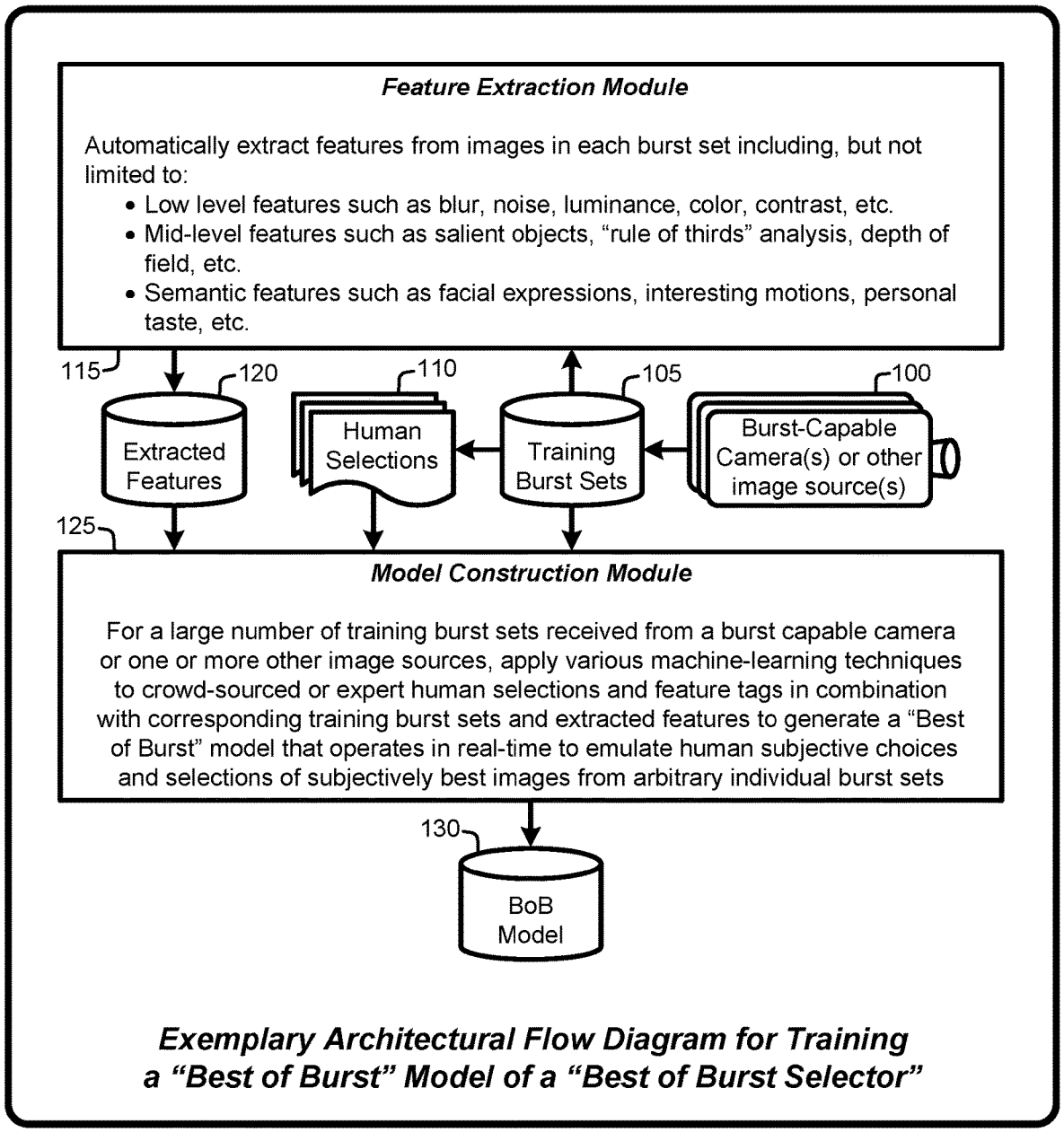

In the following description of various implementations of a "Best of Burst Selector," also referred to as a "BoB Selector," reference is made to the accompanying drawings, which form a part hereof, and in which is shown by way of illustration specific implementations in which the BoB Selector may be practiced. Other implementations may be utilized and structural changes may be made without departing from the scope thereof.

Specific terminology will be resorted to in describing the various implementations described herein, and it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the BoB Selector. Further, the appearance of such phrases throughout the specification are not necessarily all referring to the same implementation, and separate or alternative implementations are not mutually exclusive of other implementations. The order described or illustrated herein for any process flows representing one or more implementations of the BoB Selector does not inherently indicate any requirement for the processes to be implemented in the order described or illustrated, and any such order described or illustrated herein for any process flows do not imply any limitations of the BoB Selector.

As utilized herein, the terms "component," "system," "client," "host," "server," and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server itself can be a component. One or more components can reside within a process and a component can be localized on one computer and/or distributed between two or more computers. Further, in the context of the BoB Selector, any of a plurality of networked servers may concurrently or separately act as either or both client computing devices and host computing devices. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In general, a "BoB Selector," as described herein, provides various techniques that operate in real-time to closely emulate human subjective choices and selections of subjectively best images (also referred to herein as a "favorite image") from arbitrary individual burst sets. More specifically, the BoB Selector automatically selects one or more highest ranked images that are above a predetermined or adjustable quality threshold from a set of images of a scene captured in a burst or continuous capture mode, captured as a video sequence, or captured as multiple images of the scene over any arbitrary period of time and any arbitrary timing between images. The number of selected subjectively best images can range from one to a preselected maximum, e.g., the top three highest ranked images. The BoB Selector considers various features, ranging from low-level features to very high-level sematic features, which are combined into a unified framework that is general enough to incorporate any other potentially useful features, including user-defined features. Further, in the case that no images of the burst set exceed the quality threshold, the BoB Selector optionally does not output any subjectively best images.

Selection of the subjectively best images is achieved in real-time by applying a machine-learned model (e.g., a best of burst model, also referred to as a "BoB model") to the burst set. The machine-learned BoB model is trained via techniques including, but not limited to, a local ordinal regression optimization process tailored for burst data in combination with crowd-sourced and/or expert feature tagging of images. The resulting BoB model operates to select one or more subjectively best images from the burst set in a way that closely emulates human selection based on subjective subtleties of human preferences. Images or frames automatically selected by the BoB Selector are then presented to a user or saved for further processing.

Further, in various implementations, a machine-learned global quality model operates in combination with the BoB model to jointly predict one or more subjective best output frames within each burst set. In general, the subjectively best of burst frame (or multiple image frames) is predicted by the BoB model, while other frames that are both sufficiently different from the predicted subjectively best of burst and that are also sufficiently different from any other already selected frames and predicted to be subjectively good images are determined by the global quality model. In other words, in various implementations, images within a burst that are both sufficiently different from the BoB frame (and sufficiently different from any other already selected frame) and predicted to be highly ranked in terms of subjective quality are output as complementary images for any particular burst set.

Figure 2:
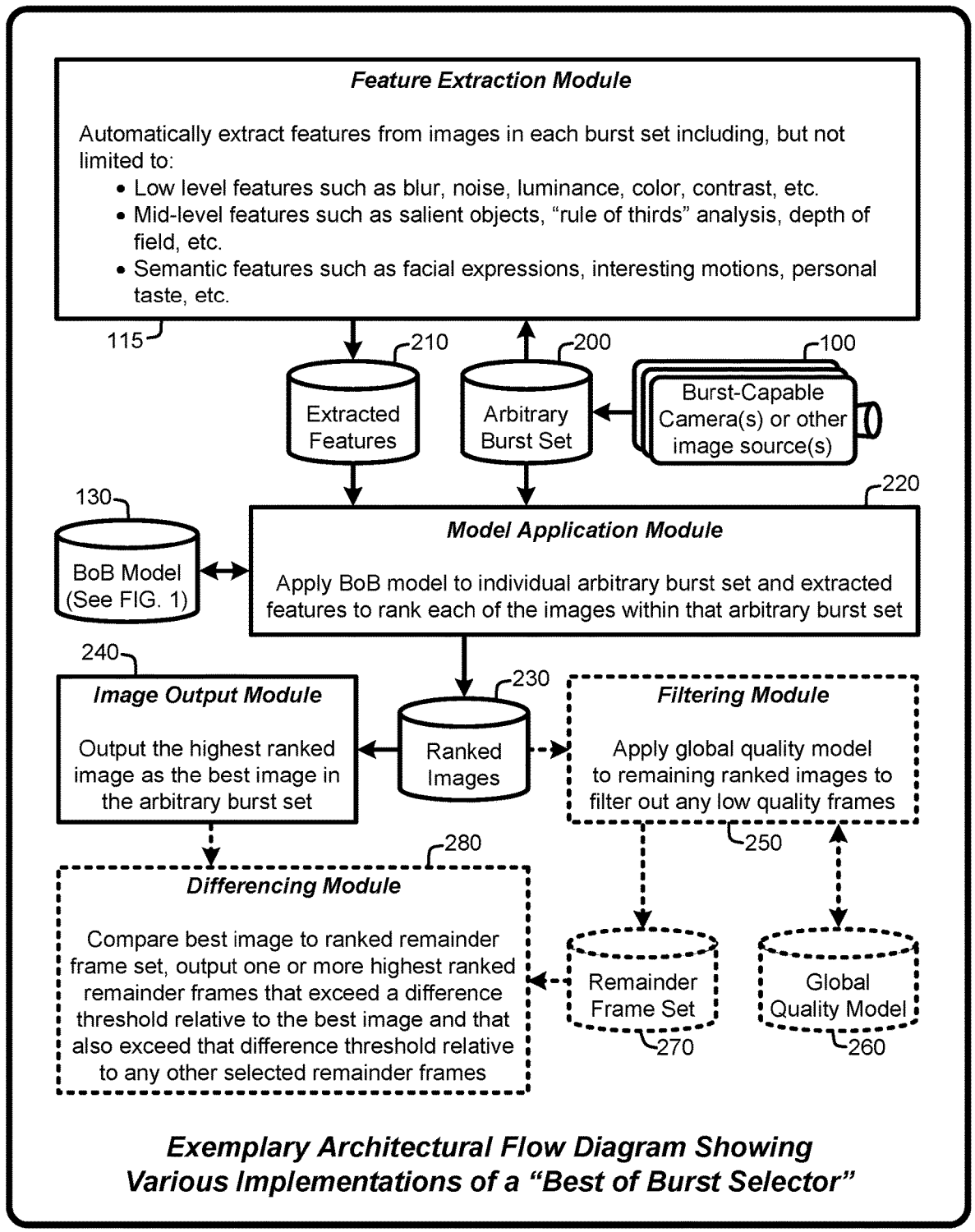
FIG. 2 provides an exemplary architectural flow diagram that illustrates program modules for effecting various implementations of the BoB Selector, as described herein.

1.1 System Overview:

As mentioned above, the BoB Selector provides various techniques that operate in real-time to closely emulate human subjective choices and selections of subjectively best images from arbitrary individual burst sets. The processes summarized above are illustrated by the exemplary architectural flow diagram of FIG. 1 and FIG. 2. However, while the diagrams of FIG. 1 and FIG. 2 illustrate a high-level view of various implementations of the BoB Selector, FIG. 1 and FIG. 2 are not intended to provide an exhaustive or complete illustrations of every possible implementation of the BoB Selector as described throughout this document. In general FIG. 1 illustrates an exemplary implementation for training the BoB model, while FIG. 2 illustrates exemplary implementations for applying the learned BoB model to an arbitrary burst set to predict one or more subjectively best image frames from that burst set. Further, elements within FIG. 2 having the same reference number as FIG. 1 are intended to illustrate elements of FIG. 1 that may be reused in FIG. 2.

For example, as illustrated by FIG. 1, in various implementations, one or more burst-capable cameras 100 or other imaging devices are applied to capture a large number of training burst sets 105. Alternately, or in addition, one or more of the training burst sets 105 may be provided as pre-recorded sets of sequential images received from any image source. In general, each of these training burst sets 105 includes a plurality of images of a scene captured in a burst or continuous capture mode of the burst-capable cameras or other input sources 100. The training burst sets 105 may also be captured in a video mode of the burst-capable cameras or other input sources 100 or captured as multiple images of the scene over any arbitrary period of time and any arbitrary timing between images.

Each of the training burst sets 105 is provided to multiple crowd-sourced or expert human reviewers, or any desired group of one or more human reviewers, for initial evaluation. More specifically, human review of each individual training burst set 105 is performed to select a subjectively best image and/or to rank the images from each of the training burst sets. In other words, each human reviewer selects a favorite or preferred image from each training burst set 105 based on that reviewer's subjective preferences. Further, multiple different humans may review the same individual burst set 105. In addition, each human review of any training burst set 105 results in a corresponding human selection 110 of the subjectively best images from that training burst set.

In addition, in various implementations, one or more of the human selection 110 is annotated or tagged (e.g., hand-labeled annotation vectors, tags, feature labels, etc.) by the person making the selection to include information relating to one or more of the features or image characteristics considered by that person in selecting the subjectively best images. As such, depending on how many humans have reviewed any particular training burst set 105, and the selections made by those humans, any particular training burst set may be associated with multiple human selections 110 of subjectively best images, each of which may optionally include corresponding annotation vectors, tags, feature labels, etc. For purposes of discussion, annotation vectors, tags, feature labels, etc. will be referred to collectively as "annotation vectors." These annotation vectors relate to one or more features or characteristics of the image that were considered by the human review in selecting or ranking an image.

In addition, a Feature Extraction Module 115 is separately applied to each of the training burst sets 105 to automatically extract a plurality of extracted features 120 from the images in each training burst set. In other words, the Feature Extraction Module 115 applies various image processing techniques to automatically generate a separate set of extracted features 120 for each of the training burst sets 105. Examples of these automatically extracted features 120 include, but are not limited to, low level features such as blur, noise, luminance, color, contrast, etc., mid-level features such as salient objects, "rule of thirds" analysis, depth of field, etc., semantic features such as facial expressions, interesting motions, personal taste, etc. Image feature extraction techniques are known to those skilled in the art and will not be described in detail herein.

The original training burst sets 105, the corresponding human selections 110 (with optional annotation vectors) and the corresponding extracted features 120 are then provided to a Model Construction Module 125. In general, the Model Construction Module 125 applies various machine-learning techniques to the combination of the training burst sets 105, the corresponding human selections 110 (with optional annotation vectors) and the corresponding extracted features 120 to generate a "Best of Burst" model (also referred to as a "BoB model" 130). As described in further detail herein this BoB model operates in real-time to closely emulate human subjective choices and selections of subjectively best images when applied to arbitrary individual burst sets.

For example, as illustrated by FIG. 2, in various implementations, a Model Application Module 220 applies the BoB model 130 to an arbitrary burst set 200 (e.g., a burst set other than one used to train the BoB model) to rank images within that arbitrary burst set by predicting a measure of a subjective best image within that arbitrary burst set 140.

More specifically, in various implementations, one or more burst-capable cameras or other image sources 100 are applied to capture the arbitrary burst set 200. In general, the arbitrary burst set 200 includes a plurality of images of a scene captured in a burst or continuous capture mode of the burst-capable cameras or other input sources 100. The arbitrary burst sets 200 may also be captured in a video mode of the burst-capable cameras or other input sources 100 or captured as multiple images of the scene over any arbitrary period of time and any arbitrary timing between images.

As with the training burst sets 105 illustrated in FIG. 1, the arbitrary burst set 200 of FIG. 2 is then provided to the Feature Extraction Module 115. the Feature Extraction Module 115 is then applied to the arbitrary burst set 200 to automatically extract a plurality of extracted features 210 from the images in the arbitrary burst set. In other words, the Feature Extraction Module 115 applies various image processing techniques to automatically generate a set of extracted features 210 from the arbitrary burst set 200. As with the discussion regarding FIG. 1, examples of these automatically extracted features 210 include, but are not limited to, low level features such as blur, noise, luminance, color, contrast, etc., mid-level features such as salient objects, "rule of thirds" analysis, depth of field, etc., semantic features such as facial expressions, interesting motions, personal taste, etc.

The Model Application Module 220 then applies the BoB model 130 to the arbitrary burst set 200 in combination with the extracted features 210 derived from that arbitrary burst set to rank images within that arbitrary burst set. In other words, the BoB model 130 is applied to the arbitrary burst set 200 and the corresponding extracted features 210 to predict a measure of subjective best images within that arbitrary burst set. In other words, this measure of subjective best images is applied to rank the images in the arbitrary burst set 200 from a predicted best to a predicted worst to construct a separate set of ranked images 230 corresponding to the arbitrary burst set. For each arbitrary burst set 200, an Image Output Module 240 then outputs the image or frame having the highest ranking within the corresponding set of ranked images 230 as the subjectively best image of that arbitrary burst set.

Further, in various implementations, an optional Filtering Module 250 applies a global quality model 260 to the remaining ranked images 230 (e.g., the images other than the subjectively best image provided by the Image Output Module 240) to filter out any low-quality image frames. In various implementations, the resulting remainder frame set 270 is then provided to a Differencing Module 280 for comparison to the subjectively best image provided by the Image Output Module 240. In general, the Differencing Module 280 compares the subjectively best image to the ranked remainder frame set 270, and optionally outputs one or more of the highest ranked remainder frames that exceed a predefined or adjustable difference threshold relative to the subjectively best image and that also exceed that difference threshold level with respect to any other already selected images of the remainder set. In other words, the image frames in the remainder frame set 270 are compared, in order of ranking, to the subjectively best image provided by the Image Output Module 240. The Differencing Module 170 then outputs the highest ranked frame of the remainder frame set 270 that is sufficiently different from the subjectively best image that is likely to be of interest to a human user. The Differencing Module 170 then optionally repeats this process one or more times to output one or more additional highest ranked frames of the remainder frame set 270 that are sufficiently different from the subjectively best image and that is also sufficiently different from any other frames already selected by the Differencing Module.

2.0 Operational Details of the BoB Selector:

The above-described program modules are employed for enabling various implementations of the BoB Selector. As summarized above, the BoB Selector provides various techniques that operate in real-time to closely emulate human subjective choices and selections of subjectively best images from arbitrary individual burst sets. The following sections provide a detailed discussion of the operation of various implementations of the BoB Selector, and of exemplary methods for implementing the program modules and features described in Section 1 with respect to FIG. 1 and FIG. 2. In particular, the following sections provides examples and operational details of various implementations of the BoB Selector, including:

An operational overview of the BoB Selector;
Feature extraction;
Local ordinal learning for best of burst (BoB) analysis;
Exemplary evaluation protocols;
Local ordinal learning via long-short-term-memory; and
Outputting multiple subjectively best frames from burst sets.

2.1 Operational Overview:

Typical burst-capable camera devices operate to capture image frames on the order of about 10 frames per second (or in the case of a shutter that remains open while multiple frames are captured, 10 frames per shutter). However, depending on the capabilities of the particular camera or imaging device, the number of frames captured over some particular unit of time or shutter opening can vary significantly. Further, depending on camera capabilities and/or user interaction with that camera, the time over with the burst set is captured may vary significantly (e.g., ranging from a fraction of a second to image sequences captured at any desired intervals over a period of years). However, for purposes of explanation, the following discussion will generally refer to capturing a burst set of 10 frames per shutter. Further, for purposes of explanation, the following discussion will generally refer to a one second gap between shutter openings. In various implementations, the BoB Selector is capable of fully processing the resulting burst set and outputting a predicted subjectively best image from that burst set in the one second gap between shutters. As such, the BoB Selector is fully capable of performing real-time selection of subjectively best images from arbitrary burst sets.

As mentioned above, the BoB Selector provides various techniques and features that operate in real-time to closely emulate human subjective choices and selections of subjectively best images from arbitrary individual burst sets. The subjective reasons for why people pick the subjectively best frame or frames from any particular burst set typically depend on a wide range of features from very low-level meanings or features to high-level semantic meanings or features. For example, a user may select a subjectively best frame from a particular burst set based on blur levels of images with the burst set. Alternately, that user may select the subjectively best frame from that burst set based on both the facial expression and blurriness. Alternately, that user may select the subjectively best frame from that burst set based on a combination of reasons such as facial expression, whether a subject's eyes are closed or open, image exposure, etc. Advantageously, rather than requiring the user to view or examine some or all of the images in a potentially large number of burst sets, the BoB Selector performs real-time automated selection of subjectively best images from the burst set and then presents those selections to the user without requiring user input or selection, thereby increasing user efficiency and reducing user workload in reviewing image burst sets.

2.2 Feature Extraction:

In general, whether a particular image frame in a burst set is selected as the subjectively best frame of that burst set is determined as a function of multiple criteria. The BoB Selector considers multiple features for this purpose. Examples of these features include, but are not limited to, blur, spatial pyramid blurriness features (e.g., global and spatially local blur estimation values), noise, luminance, luminance gradient histograms, brightness, brightness histograms, color, hue, saturation, contrast, salient objects, "rule of thirds" analysis, depth of field, number of faces, face size, ratio and location, face landmark features, such as eyes open or closed features, mouth open or closed, etc., facial expressions, interesting motions, personal taste, composition features, etc. Image feature extraction techniques are known to those skilled in the art and will not be described in detail herein.

Additional features that are considered by various implementations of the BoB Selector include, but are not limited to, flow histograms, motion boundary histograms, and accumulated flow histograms. For example, in the case of accumulated flow histograms, at frame t, the accumulated flow can be computed as $\Sigma_{i=1}^{t} \Sigma_{j=1}^{M} f_j^i$, where $f_j^i$ is the flow vector at pixel j of frame i within the burst set and M is the total number of pixels for each frame. In various implementations, this flow vector is normalized.

In addition, during the BoB model training stage, in various implementations the subjectively best images selected from each training burst set via crowd-sourced or expert-based evaluations are optionally annotated (e.g., annotation vectors) by the person making the selection to include information relating to the features considered in selecting that subjectively best image.

2.3 Local Ordinal Learning for Best of Burst Analysis:

In various implementations, training of the machine-learned BoB model for predicting the subjectively best image in a burst set is achieved by applying various machine-learning functions to learn a predication function, $f$. In various implementations, the prediction function comprising the BoB model is learned via a local ordinal regression optimization process. As such, the learned model may also be referred to as a "local ordinal model" or the like. The prediction function comprising the BoB model ensures that during runtime, the frame within the burst that has the maximum value of $f$ will be predicated as the subjectively best frame in the burst set as illustrated by Equation (1):

$$f(w,b,x) = w^T x + b \quad \text{Equation (1)}$$

where x is a particular one of the input features (e.g., smiling face in frame, blur, motion estimates, etc.), b represents a bias associated with the feature and w represents a corresponding weight or importance associated with the feature.

Given Equation (1), suppose $x^i(x_0^i, x_1^i, \ldots, x_{15}^i)$ is one typical burst set comprising a sequence of images of a scene. The subjectively best frame $x_k^i$ has the following property: $f(w,b,x_k^i) - f(w,b,x_l^i) > 0$, for all $l \in \{0, 1, \ldots, 15\}$, $l \neq k$. Given this property, the issue is how to learn $f(w,b,x)$. In various implementations, this issue is addressed as discussed in the following paragraphs.

For example, let $X = (x^1, x^2, \ldots, x^n)$ denote n separate burst sets, each of which contains some maximum number of image frames (e.g., 15 frames). Further, let $Y = (y^1, y^2, \ldots, y^n)$ denote corresponding optional annotation vectors provided by the persons selecting the subjectively best images in each burst set. So, for one typical frame, $x_j^i$ within burst i, its corresponding label would be denoted as $y_j^i$, which may be feature ranking values, e.g., $\{0, 1, 2, 3, 4\}$ with 4 representing a good example of a particular feature and 0 representing a poor example of that feature.

The intuition is that for any pair of frames (j, l) within burst i, if $y_j^i > y_l^i$, the corresponding discrimination function will have similar a ordinal property: $f(w,b,x_j^i) > f(w,b,x_l^i)$, and the difference gap will respect their label margin, which can be defined as a loss function $\Delta(y_j^i, y_l^i)$. For example, in a tested implementation of the BoB Selector, $\Delta(y_j^i, y_l^i)$ is defined as illustrated by Equation (2):

$$\Delta(y_j^i, y_l^i) = \frac{|\exp(y_j^i) - \exp(y_l^i)|}{Z} \quad \text{Equation (2)}$$

where Z is a constant value to ensure $\Delta$ lies in the range of [0,1]

Assuming some number n of burst sets, local ordinal learning can be achieved as illustrated by the optimization of Equation (3), as follows:

$$\underset{w,\xi}{\text{Minimize}} \quad \frac{1}{2} w^T w + C \sum_{i=1}^{n} \sum_{j=1}^{16} \sum_{l=j+1}^{16} \xi_{jl}^i \quad \text{Equation (3)}$$

s.t. for $i = 1, \ldots, n$
and any pair $(j, l)$ within $i$
$\xi_{jl}^i \geq 0$
$\text{sign}(y_j^i - y_l^i)(w^T x_j^i - w^T x_l^i) \geq \Delta(y_j^i, y_l^i) - \xi_{jl}^i$ where sign(x) is defined by Equation (4) as:

$$\text{sign}(x) = \begin{cases} +1 & x > 0 \\ -1 & x < 0 \\ 0 & x = 0 \end{cases} \quad \text{Equation (4)}$$

In order to solve this optimization, one of a variety of possible approaches is to use a Lagrange multiplier and convert the above optimization from a primal form to its corresponding dual form. For example, denote $\alpha$ as the dual variable (with the dimensionality equal to the total number of pair-wise constraints) and denote Q as the kernel matrix (could be linear, or non-linear). Then, the dual form can be represented by Equation (5), as follows:

$$\underset{\alpha}{\text{Minimize}} \quad \frac{1}{2} \alpha^T Q \alpha - y^T \alpha \quad \text{Equation (5)}$$

subject to $0 \leq \alpha \leq C$ based on the KKT condition (i.e., the Karush-Kuhn-Tucker (KKT) condition), the solution of the primal form can be derived as $w = \sum_i^n \alpha_i x'_i$, where $x'_i$ represents the feature differences in Equation (3).

This type of dual form is sometimes considered infeasible to solve without expending significant computational resources. For example, suppose there are n=10,000 burst sets, each of which has 15 frames. Then in theory, there would be a total of m=10,000*15*14/2=1,050,000 pair-wise constraints in Equation (3), which in turn makes Q an m×m dense matrix. Given that there are not obvious structures in Q, it's quite challenging to use existing optimization solvers that can solve the QP problem illustrated in Equation (5).

Therefore, in various implementations, the BoB Selector applies a Stochastic Gradient Decent (SGD) process to solve the problem of Equation (5). For example, Equation (3) can be simplified to produce Equation (6), as follows:

$$L(w) = \frac{1}{2} w^T w + C \frac{1}{m} \sum_{i=1}^{m} \max(0, \Delta(y_i) - w^T x_i) \quad \text{Equation (6)}$$

which can be rewritten as follows:

$$L(w) = \frac{1}{m} \sum_{i=1}^{m} l_i(w, x, y) \quad \text{Equation (7)}$$

where $$l_i(w, x, y) = \frac{1}{2} w^T w + \max(0, \Delta(y_i) - w^T x_i) \quad \text{Equation (8)}$$

Then, during each iteration of SGD, one constraint is randomly picked to update w, which results in the following updating equation:

$$w^{k+1} = w^k - \eta_k \nabla l_i(w,x,y) \quad \text{Equation (9)}$$

where $\eta_k$ is the learning rate at the iteration k. Further, in various implementations, $\nabla l_i(w,x,y)$ may be the gradient of a mini-batch, not necessarily a single constraint.

2.4 Exemplary Evaluation Protocols:

Suppose y: $(y_0, y_1, \ldots, y_{15})$ represents the predication votes for each frame within a specific burst set, and $\bar{y}$: $(\bar{y}_0, \bar{y}_1, \ldots, \bar{y}_{15})$ represents annotated ground truth features. A variety of metrics can be used to measure the distance between y and $\bar{y}$.

For example, consider a winner-takes-all type metric. In this metric, let $I^* = \mathrm{argmax}_{i \in 1, 2, \ldots, 16}(y_i)$. In this metric, it only matters if $I^*$ is equal to $\bar{I}$, where similarly $\bar{I} = \mathrm{argmax}_{i \in 1, 2, \ldots, 16}(\bar{y}_i)$. So, for each burst set, the predication result would be either one or zero, depending on whether $I^* = \bar{I}$. Thus, function $Y(I^*, \bar{I})$ can be defined as:

$$Y(I^*, \bar{I}) = \begin{cases} 1 & I^* = \bar{I} \\ 0 & \text{otherwise} \end{cases} \quad \text{Equation (10)}$$

Another metric that may be considered is a Top-K accuracy type metric. For example, as long as l* is in the set of Top K votes of the crowd-sourced or expert-based evaluations of the frames of the training burst set, then it is treated as a correct predication. Consequently, the indicator function of a subset A of a set X, $1_A: X \to \{0,1\}$ can be defined as:

$$1_A(I^*) = \begin{cases} 1 & \text{if } I^* \in A \\ 0 & \text{if } I^* \notin A \end{cases} \quad \text{Equation (11)}$$

where A is the set of frames that have all the positive votes. However, it is possible that A could contain only one frame. This occurs, for example, when the training burst set has an obvious subjectively best photo so that the crowd-sourced or expert-based evaluations all select the same one. In such case, Top-K is equivalent to the Winer-Takes-All case.

Another metric that may be considered is a soft Top-K accuracy type metric. For example, first sort the sequence of the burst set in terms of the number of votes for each frame in that burst set. Denote as the vote for each frame in the sorted list. This results in $y(y_{I_1}, \ldots, y_{I_{|A|}})$, $y_{I_1} > y_{I_2} > \ldots > y_{I_{|A|}} > 0$. Thus, if $y_{I^*_+} \notin A$, that means $y_{I^*} = 0$, and its corresponding accuracy would be zero. Otherwise, it would compute a soft measure to indicate how close it is to the subjectively best frame in the burst set:

$$1_A(I^*) = \frac{y_{I^*}}{y_{I_1}} \quad \text{Equation (12)}$$

Another metric that may be considered is a Kullback Leibler (KL) distance type metric. In general, the Kullback Leibler distance is a natural distance function from a "true" probability distribution, p, to a "target" probability distribution, q. For discrete (not necessarily finite) probability distributions, $p = p_1, \ldots, p_n$ and $q = q_1, \ldots, q_n$, the KL-distance is defined as:

$$KL(p,q) = \sum_i^n p_i \log_2(p_i/q_i) \quad \text{Equation (13)}$$

where q and p are the corresponding normalized probability distribution for user's noting $\bar{y}$ and the predicated y respectively.

Another metric that may be considered is a mean accuracy type metric. For example, suppose there is a burst set S with n burst sequences, then the mean accuracy can be given by:

$$\text{Mean Accuracy} := \frac{\sum_i^n 1_{A_i}(I_i^*)}{n} \quad \text{Equation (14)}$$

Another metric that may be considered is a comparison with a weighted binary classifier. For example, consider whether frames of the training burst set that are selected as the subjectively best image by the crowd-sourced or expert-based evaluations are to be treated as positive examples while the other frames as treated as negative examples to directly train a binary classifier with different example weights. Intuitively, the number of votes (i.e., selection as subjectively best image by multiple crowd-sourced or expert-based evaluations) may be set as the weight for each example. So, one frame that receives 5 votes, for example, from a total of five human reviewers implies that the classifier should make sure it will be classified correctly, as illustrated by Equation (15), as follows:

$$\begin{aligned}
\underset{w,\xi}{\text{Minimize}} \quad & \frac{1}{2} w^T w + C_2 \sum_{j=1}^n (y_j + 1)\xi_j \quad \text{Equation (15)} \\
\text{subject to} \quad & y_j * (w^T x_j + b) \geq 1 - \xi_j, \; j = 1, \ldots, n \\
& \xi_j \geq 0, \; j = 1, \ldots, n
\end{aligned}$$

2.5 Local Ordinal Learning Via Long-Short-Term-Memory:

Intuitively, the learning problem discussed above can be cast as a sequence labeling problem. That means, for each burst set $x(x_0, x_1, \ldots, x_{15})$ (assuming 15 frames per set) and its corresponding annotation vectors $y(y_0, y_1, \ldots, y_{15})$, where $y_i \in \{0, 1, 2, 3, 4, 5\}$ and $\Sigma_{i=0}^{15} y_i = 5$ (assuming, for example, that there are only 5 votes for subjectively best image from crowd-sourced or expert-based evaluations for each burst set), the learned recurrent network $f$ can transfer x into y, so $f(x)=y$. In various implementations, $f$ is represented as a multiple layered recurrent network with long-short-term-memory cells to model the dynamic context information. Specifically, such dynamic context may be accomplished by learning two gate functions $i_t$ and $f_t$.

2.6 Outputting Multiple "Best" Frames from Burst Sets:

In general, the above-described local ordinal model (e.g., the machine-learned BoB model) is applied for predicting and ranking a relative subjective goodness of each frame within the burst set to select a single subjectively best image from that burst set based on the rankings. In other words, the BoB model predicts relative local goodness of image frames in a particular burst set based on features extracted from the frames of that burst set. As described above, in various implementations, the BoB Selector outputs the highest ranked frame as the subjectively best image. However, depending on the type of images in the burst set (e.g., motion related scene or objects), it may be desired to output more than one "best" frame. In this case, after outputting the highest ranked frame, the remaining frames (ranked from bottom ranked to the second best) are then passed to a global quality model to filter out any frames having a quality below some threshold value. The remaining frames are then compared to the highest ranked frame from the burst set (and any other frames already selected from the remaining frames) to determine whether any of those remaining frames are sufficiently different from the highest ranked frame (and any other frames already selected from the remaining frames).

In contrast to the local ordinal model (e.g., the BoB model), the global quality model is directed towards answering the question of whether particular frames are likely to be of a quality that is acceptable to a majority of people. A low global quality frame generally contains numerous defects such as blur, poor contrast, incorrect exposure, incorrect while balance, etc. Thus, in contrast to the BoB model, which is directed towards predicting the relative goodness of frames within the burst sequence, the global quality model is directed towards predicting an absolute goodness in the context of a universal image quality space.

One exemplary purpose of applying the global quality model to the burst set is to remove unacceptable frames within the sequence of images in order to generate a candidate frame list for subsequent uniqueness analysis relative to the predicted subjectively best image. However, the global quality model is not intended to be limited to this exemplary purpose. Further, in various implementations, a fixed or adjustable threshold is specified or defined during a runtime stage of the BoB Selector to generate the aforementioned candidate list for BoB uniqueness. In various implementations, this threshold is learned by cross-validation from another separate dataset.

In various implementations, to train this global quality model, the Bob Selector applies various crowdsourcing techniques to collect meaningful tags for a large collection of arbitrary images. Each image is tagged by multiple people, e.g., five different people) that are each tasked to tag a degree of goodness (e.g., a human subjective quality rating) of each image. For example, in a tested implementation of the BoB Selector, reviewers were tasked to tag images with a number of stars ranging from 1 to 5. In this tested implementation, a score of three or more stars was defined as generally corresponding to an acceptable frame, however, any scoring mechanism or level may be applied for this purpose. The resulting scored images in this tagged dataset are then applied as input to a machine learning process for training a global regression model to predict user image preferences. In a tested implementation, any majority consensus of reviewer scores of particular images was applied to normalize a final tag for each frame before feeding those frames and tags to the regression learner. In various implementations, the global quality model was trained on the same feature set that was applied to train the BoB model. However, any desired feature set may be applied for this purpose.

For example, in various implementations, the BoB model predicts a subjective goodness score for ranking each frame in the burst set. These ranked frames are then sorted based on the scores. The top ranked frame (or multiple highest ranked frames) is then output as the subjectively best image. The aforementioned global quality model is then applied to filter out any low-quality frames from the frames remaining in the burst set (e.g., all frames other than the highest ranked frame already output as the subjectively best frame). After filtering out any low-quality frames, the final remaining set of frames (e.g., the candidate list of frames) is designated as $R=[r_1, r_2, \ldots, r_k]$, where k is the remaining number of frames (which may be zero, depending on the quality of images in the burst set.

As discussed with respect to FIG. 2, for each remaining frame $r_i$ in $[r_1, r_k]$, the BoB Selector compares each of those frames (in order of highest to lowest ranking) to the highest ranked frame already output as the subjectively best frame to determine whether $r_i$ is sufficiently different (e.g., exceeds some distance threshold or measure) from that highest ranked frame and that is also sufficiently different from any other already selected images of the remaining frames. In other words, in various implementations, the BoB Selector preforms a uniqueness analysis of the frames in the candidate list relative to the subjectively best frames. If $r_i$ is sufficiently different from the subjectively best frame and any other already selected frames, then it is output as an additional subjectively best frame. If not, the next highest ranked frame is in turn compared to the highest ranked frame already output as the subjectively best frame, and output if it is sufficiently different. This process continues until some maximum number of image frames has been output or until there are no additional frames of the burst set remaining for comparison.

Figure 3:
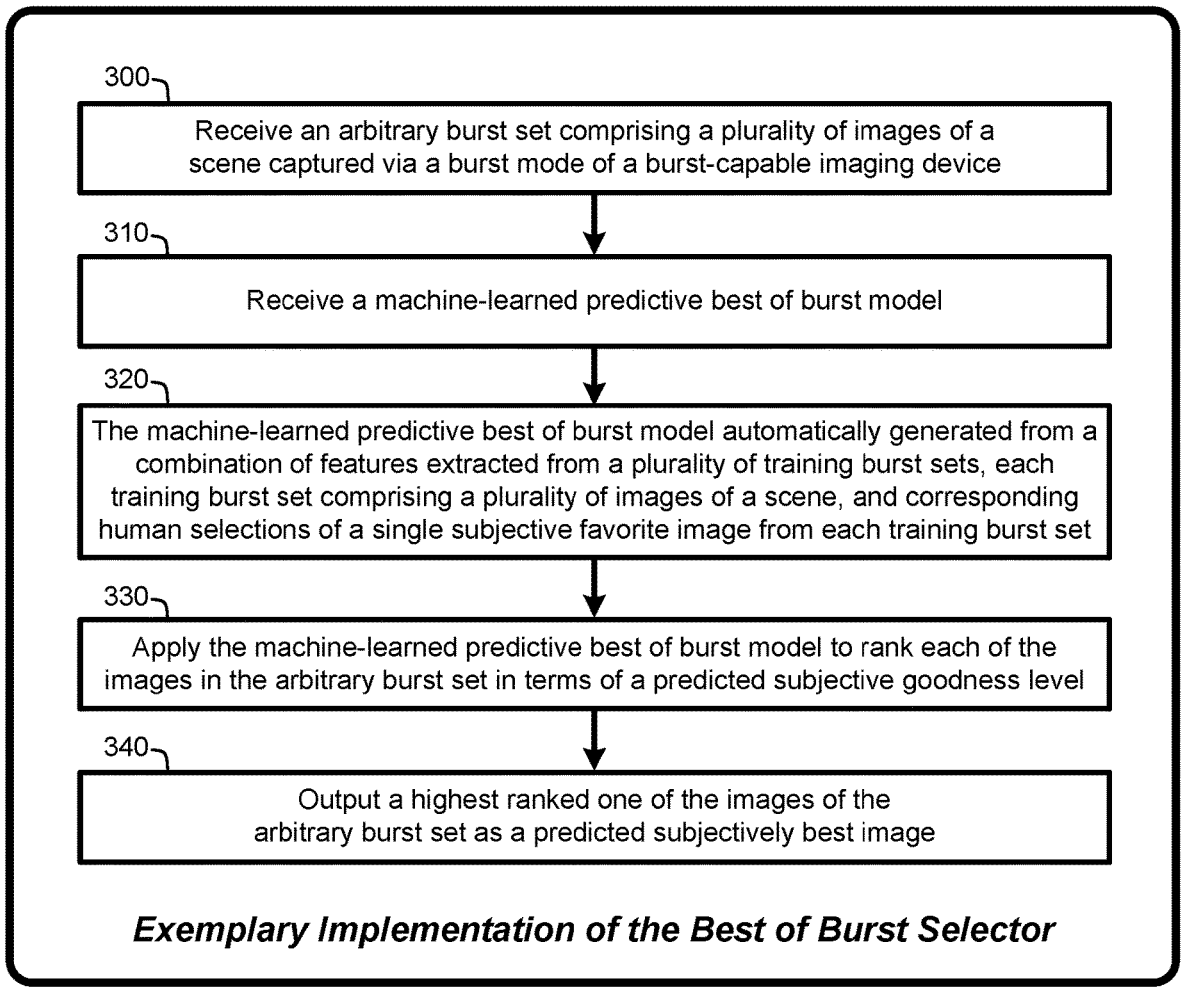
FIG. 3 illustrates a general system flow diagram that illustrates exemplary techniques for effecting various implementations of the BoB Selector, as described herein.
Figure 4:
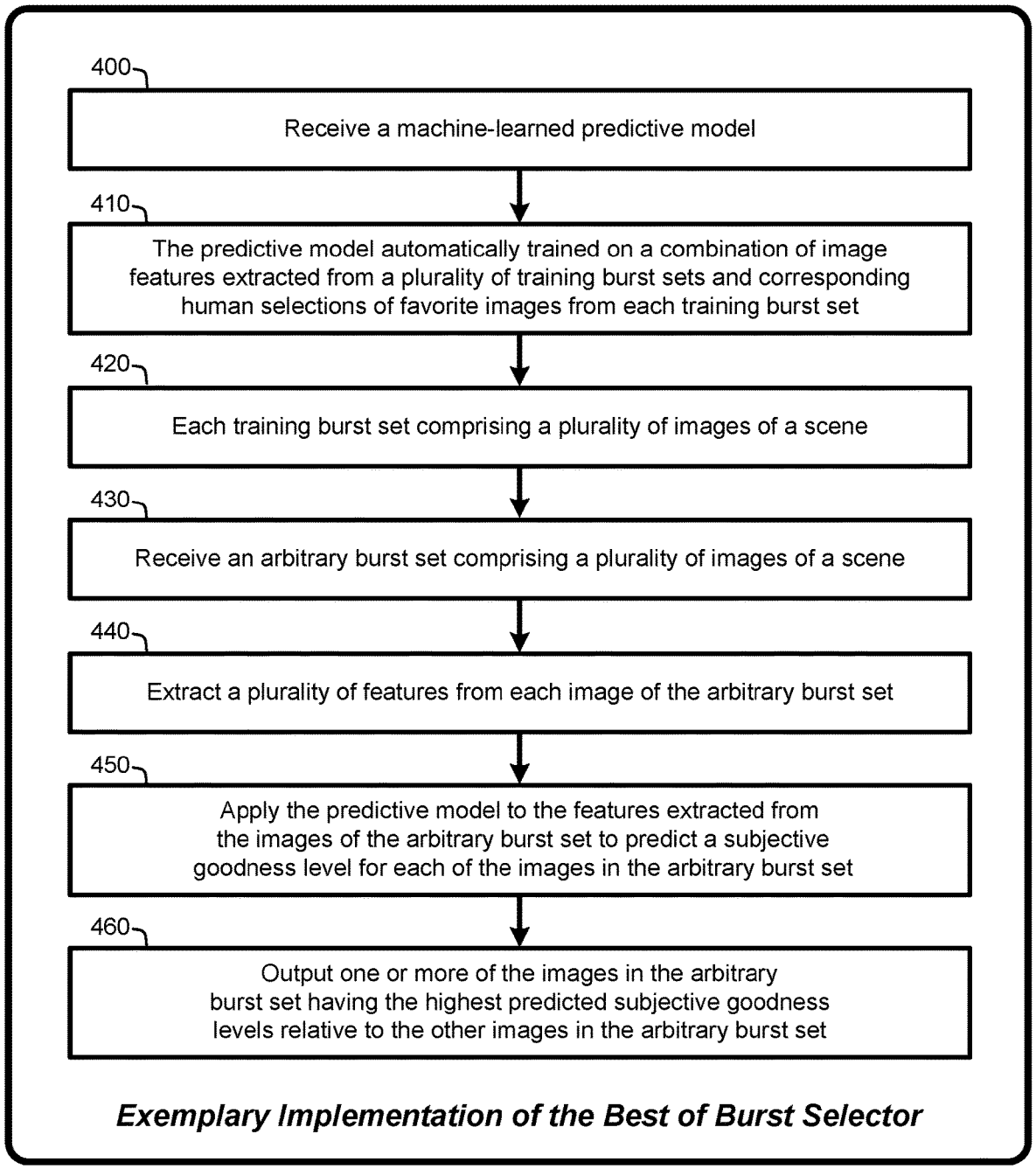
FIG. 4 illustrates a general system flow diagram that illustrates exemplary techniques for effecting various implementations of the BoB Selector, as described herein.
Figure 5:
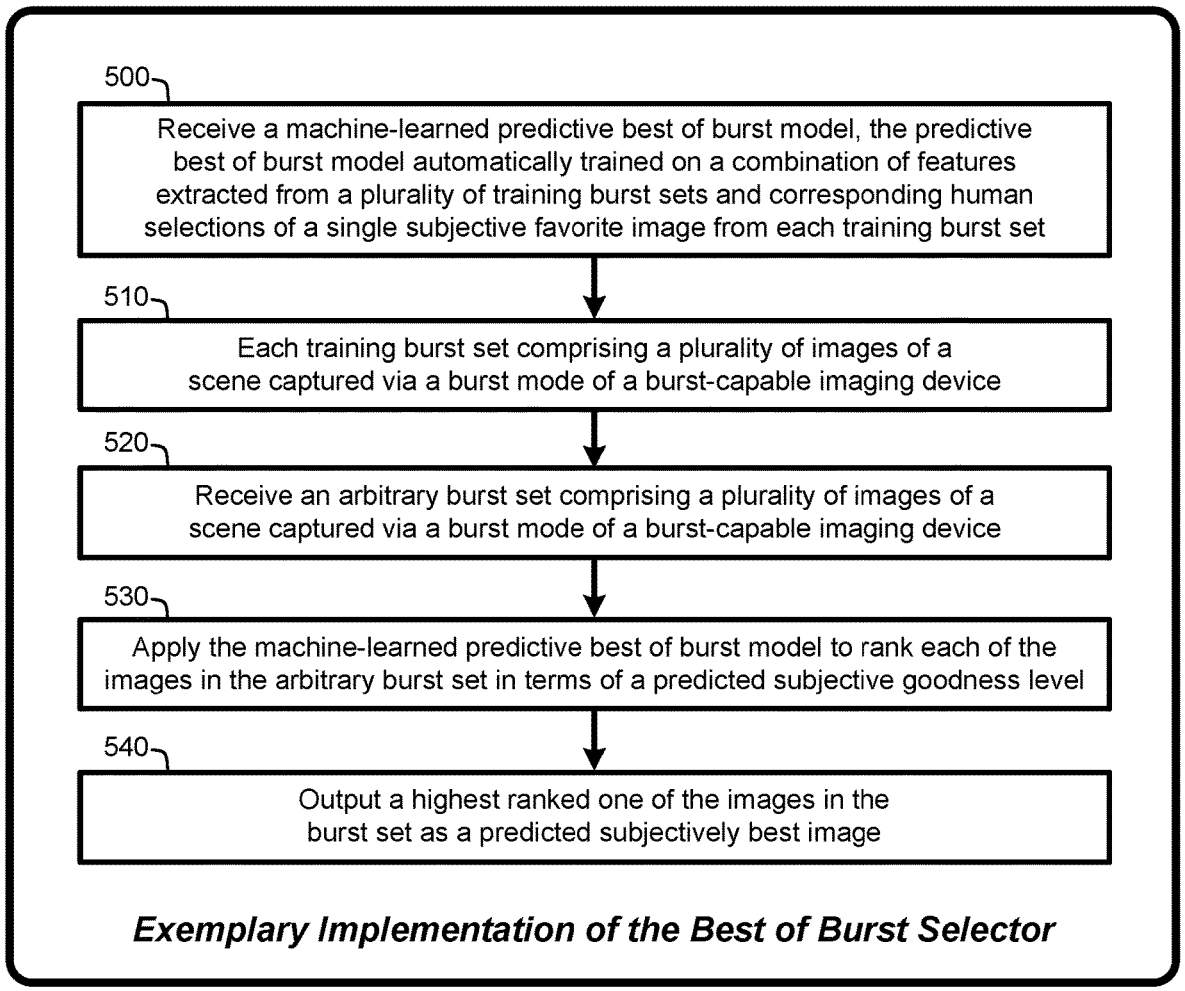
FIG. 5 illustrates a general system flow diagram that illustrates exemplary techniques for effecting various implementations of the BoB Selector, as described herein.

3.0 Operational Summary of the BoB Selector:

The processes described above with respect to FIG. 1 and FIG. 2, and in further view of the detailed description provided above in Sections 1 and 2, are illustrated by the general operational flow diagrams of FIG. 3 through FIG. 5. In particular, FIG. 3 through FIG. 5 provide exemplary operational flow diagrams that summarizes the operation of some of the various implementations of the BoB Selector. FIG. 3 through FIG. 5 are not intended to provide an exhaustive representation of all of the various implementations of the BoB Selector described herein, and the implementations represented in these figures are provided only for purposes of explanation.

Further, any boxes and interconnections between boxes that may be represented by broken or dashed lines in FIG. 3 through FIG. 5 represent optional or alternate implementations of the BoB Selector described herein, and that any or all of these optional or alternate implementations, as described below, may be used in combination with other alternate implementations that are described throughout this document.

In general, as illustrated by FIG. 3, in various implementations, the BoB Selector begins operation by receiving 300 an arbitrary burst set comprising a plurality of images of a scene captured via a burst mode of a burst-capable imaging device, captured as a video sequence, or captured as multiple images of the scene over any arbitrary period of time and any arbitrary timing between images. In addition, the BoB Selector receives 310 a machine-learned predictive best of burst model. In various implementations, this machine-learned predictive best of burst model is automatically generated 320 from a combination of features extracted from a plurality of training burst sets, each training burst set comprising a plurality of images of a scene, and corresponding human selections of a single subjective favorite image from each training burst set. In various implementations, the BoB Selector then applies 330 the machine-learned predictive best of burst model to rank each of the images in the arbitrary burst set in terms of a predicted subjective goodness level BoB Selector the outputs 340 a highest ranked one of the images of the arbitrary burst set as a predicted subjectively best image.

Similarly, as illustrated by FIG. 4, in various implementations, the BoB Selector begins operation by receiving 400 a machine-learned predictive model. In various implementations, the predictive model is automatically trained 410 on a combination of image features extracted from a plurality of training burst sets and corresponding human selections of favorite images from each training burst set. In various implementations, each training burst set comprises 420 a plurality of images of a scene. In various implementations, the BoB Selector receives 430 an arbitrary burst set comprising a plurality of images of a scene. In various implementations, the BoB Selector then extracts 440 a plurality of features from each image of the arbitrary burst set. In various implementations, the BoB Selector then applies 450 the predictive model to the features extracted from the images of the arbitrary burst set to predict a subjective goodness level for each of the images in the arbitrary burst set. Further, in various implementations, the BoB Selector then outputs 460 one or more of the images in the arbitrary burst set having the highest predicted subjective goodness levels relative to the other images in the arbitrary burst set.

Similarly, as illustrated by FIG. 5, in various implementations, the BoB Selector begins operation by receiving 500 a machine-learned predictive best of burst model, the predictive best of burst model automatically trained on a combination of features extracted from a plurality of training burst sets and corresponding human selections of a single subjective favorite image from each training burst set. In addition, each training burst set comprises 510 a plurality of images of a scene captured via a burst mode of a burst-capable imaging device, captured as a video sequence, or captured as multiple images of the scene over any arbitrary period of time and any arbitrary timing between images. In various implementations, the BoB Selector then receives 520 an arbitrary burst set comprising a plurality of images of a scene captured via a burst mode of a burst-capable imaging device, captured as a video sequence, or captured as multiple images of the scene over any arbitrary period of time and any arbitrary timing between images. In various implementations, the BoB Selector then applies 530 the machine-learned predictive best of burst model to rank each of the images in the arbitrary burst set in terms of a predicted subjective goodness level. In addition, in various implementations, the BoB Selector then outputs 540 a highest ranked one of the images in the burst set as a predicted subjectively best image.

4.0 Exemplary Implementations of the BoB Selector:

The following paragraphs summarize various examples of implementations that may be claimed in the present document. The implementations summarized below are not intended to limit the subject matter that may be claimed in view of the detailed description of the BoB Selector. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, a BoB Selector is implemented by means, processes or techniques that operate in real-time to closely emulate human subjective choices and selections of subjectively best images from arbitrary individual burst sets. Advantageously, real-time automated selection of subjectively best images from the burst set increases user efficiency and reduces user workload by eliminating the need to review image burst sets to select subjectively best image frames.

As a first example, in various implementations, a computer-implemented process is implemented via means, processes or techniques that begin operation by receiving an arbitrary burst set comprising a plurality of images of a scene captured via an imaging device. In various implementations, this process then receives a machine-learned predictive best of burst model. In various implementations, the machine-learned predictive best of burst model is automatically generated from a combination of features extracted from a plurality of training burst sets, each training burst set comprising a plurality of images of a scene, and corresponding human selections of a single subjective favorite image from each training burst set. In various implementations, this process then applies the machine-learned predictive best of burst model to rank each of the images in the arbitrary burst set in terms of a predicted subjective goodness level. Finally, in various implementations, this process outputs a highest ranked one of the images of the arbitrary burst set as a predicted subjectively best image.

As a second example, in various implementations, the first example is further modified via means, processes or techniques wherein applying the machine-learned predictive best of burst model to rank each of the images in the arbitrary burst set further comprises extracting a plurality of features from each of the images of the arbitrary burst set, and applying the machine-learned predictive best of burst model to the extracted features and the corresponding images to rank each of the images.

As a third example, in various implementations, any of the first example, and the second example are further modified via means, processes or techniques wherein the human selections of the single subjective favorite image from each training burst set further comprises one or more hand-labeled annotation vectors that are applied in combination with the features extracted from the training burst sets and the corresponding human selections to automatically generate the machine-learned predictive best of burst model.

As a fourth example, in various implementations, any of the first example, the second example and the third example are further modified via means, processes or techniques wherein the automatic generation of the machine-learned predictive best of burst model further comprises applying local ordinal regression to the combination of features and the corresponding human selections to learn the predictive best of burst model.

As a fifth example, in various implementations, any of the first example, the second example, the third example, the fourth example and the fifth example are further modified via means, processes or techniques further comprising applying a global quality model to the images in the arbitrary burst set other than the predicted subjectively best image to produce a remainder set of images, and wherein the remainder set of images comprises one or more images remaining after excluding one or more images having a predicted quality below a quality threshold level.

As a sixth example, in various implementations, the fifth example is further modified via means, processes or techniques further comprising determining a difference level between the predicted subjectively best image and each of the images in the remainder set, and outputting one or more of the highest ranked images in the remainder set having a difference level exceeding a difference threshold level.

As a seventh example, in various implementations, any of the fifth example and the sixth example are further modified via means, processes or techniques wherein the global quality model is automatically generated from a combination of features extracted from a plurality of arbitrary images and corresponding human subjective quality ratings of each of those arbitrary images.

As an eighth example, in various implementations, a system is implemented via means, processes or techniques that begin operation by receiving a machine-learned predictive model. In various implementations, the predictive model is automatically trained on a combination of image features extracted from a plurality of training burst sets and corresponding human selections of favorite images from each training burst set. Further, in various implementations, each training burst set comprising a plurality of images of a scene. In various implementations, this system then receives an arbitrary burst set comprising a plurality of images of a scene. Next, in various implementations, this system then extracts a plurality of features from each image of the arbitrary burst set. In various implementations, this system then applies the predictive model to the features extracted from the images of the arbitrary burst set to predict a subjective goodness level for each of the images in the arbitrary burst set. Finally, in various implementations, this system outputs one or more of the images in the arbitrary burst set having the highest predicted subjective goodness levels relative to the other images in the arbitrary burst set.

As a ninth example, in various implementations, the eighth example is further modified via means, processes or techniques wherein the human selections of favorite images from each training burst set further comprising one or more hand-labeled annotation vectors that are applied in combination with the features extracted from the training burst sets and the corresponding human selections to automatically train the predictive model.

As a tenth example, in various implementations, any of the eighth example and the ninth example are further modified via means, processes or techniques wherein the automatic training of the predictive model further comprises applying local ordinal regression to the combination of features extracted from the training burst sets and the corresponding human selections to train the predictive model.

As an eleventh example, in various implementations, any of the eighth example, the ninth example and the tenth example are further modified via means, processes or techniques further comprising applying a global quality model to the images in the arbitrary burst set other than the one or more images having the highest predicted subjective goodness levels to produce a remainder set of images, and wherein the remainder set of images comprises one or more images remaining after excluding one or more images having a predicted quality below a quality threshold level.

As a twelfth example, in various implementations, any of the eighth example, the ninth example, the tenth example and the eleventh example are further modified via means, processes or techniques further comprising determining a difference level between the one or more images having the highest predicted subjective goodness levels and each of the images in the remainder set, and outputting one or more of the highest ranked images in the remainder set having a difference level exceeding a difference threshold level.

As a thirteenth example, in various implementations, any of the eleventh example and the twelfth example are further modified via means, processes or techniques wherein the global quality model is automatically generated from a combination of features extracted from a plurality of arbitrary images and corresponding human subjective quality ratings of each of those arbitrary images.

As a fourteenth example, in various implementations, a computer-readable storage device having computer-executable instructions is implemented via means, processes or techniques that begin operation by causing a computer to receive a machine-learned predictive best of burst model, the predictive best of burst model automatically trained on a combination of features extracted from a plurality of training burst sets and corresponding human selections of a single subjective favorite image from each training burst set. Further, in various implementations, each training burst set comprises a plurality of images of a scene captured via an imaging device. In various implementations, the computer then receives an arbitrary burst set comprising a plurality of images of a scene captured via an imaging device. Next, in various implementations, the computer applies the machine-learned predictive best of burst model to rank each of the images in the arbitrary burst set in terms of a predicted subjective goodness level. Finally, in various implementations, the computer then outputs a highest ranked one of the images in the burst set as a predicted subjectively best image.

As a fifteenth example, in various implementations, the fourteenth example is further modified via means, processes or techniques wherein applying the machine-learned predictive best of burst model to rank each of the images in the arbitrary burst set further comprises extracting a plurality of features from each of the images of the arbitrary burst set, and further comprising applying the machine-learned predictive best of burst model to the extracted features and the corresponding images to rank each of the images.

As a sixteenth example, in various implementations, any of the fourteenth example and the fifteenth example are further modified via means, processes or techniques wherein the human selections of the single subjective favorite image from each training burst set further comprising one or more hand-labeled annotation vectors that are applied in combination with the features extracted from the training burst sets and the corresponding human selections to automatically train the machine-learned predictive best of burst model.

As a seventeenth example, in various implementations, any of the fourteenth example, the fifteenth example and the sixteenth example are further modified via means, processes or techniques wherein the automatic training of the machine-learned predictive best of burst model further comprises applying local ordinal regression to the combination of features and the corresponding human selections to learn the predictive best of burst model.

As an eighteenth example, in various implementations, any of the fourteenth example, the fifteenth example, the sixteenth example and the seventeenth example are further modified via means, processes or techniques further comprising applying a global quality model to the images in the arbitrary burst set other than the predicted subjectively best image to produce a remainder set of images, and wherein the remainder set of images comprises one or more images remaining after excluding one or more images having a predicted quality below a quality threshold level.

As a nineteenth example, in various implementations, the eighteenth example is further modified via means, processes or techniques further comprising determining a difference level between the predicted subjectively best image and each of the images in the remainder set, and outputting one or more of the highest ranked images in the remainder set having a difference level exceeding a difference threshold level.

As a twentieth example, in various implementations, any of the eighteenth example and the nineteenth example are further modified via means, processes or techniques wherein the global quality model is automatically generated from a combination of features extracted from a plurality of arbitrary images and corresponding human subjective quality ratings of each of those arbitrary images.

Figure 6:
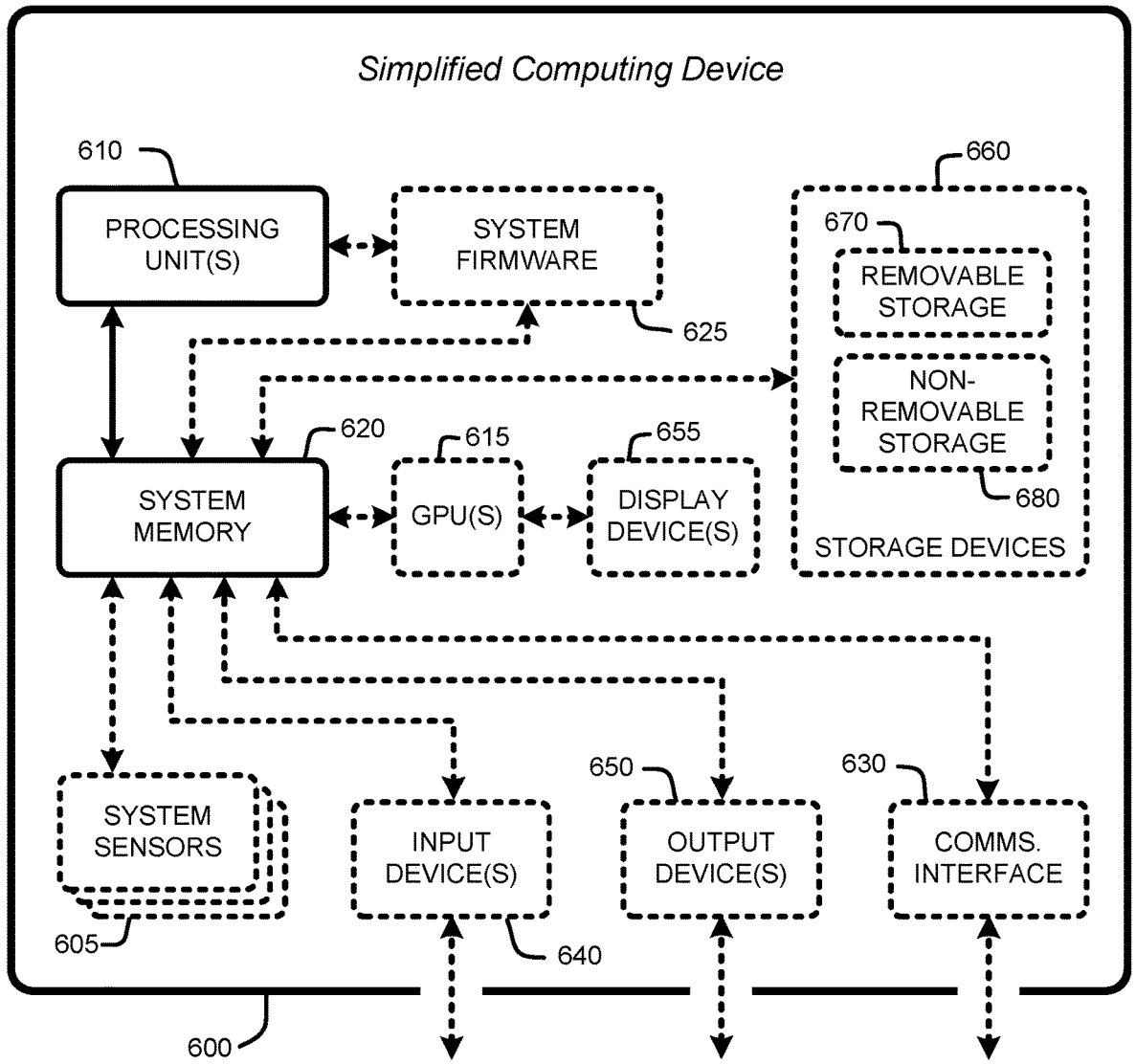
FIG. 6 is a general system diagram depicting a simplified general-purpose computing device having simplified computing and I/O capabilities for use in effecting various implementations of the BoB Selector, as described herein.

5.0 Exemplary Operating Environments:

The BoB Selector implementations described herein are operational within numerous types of general-purpose or special-purpose computing system environments or configurations. FIG. 6 illustrates a simplified example of a general-purpose computer system on which various implementations and elements of the BoB Selector, as described herein, may be implemented. Any boxes that are represented by broken or dashed lines in the simplified computing device 600 shown in FIG. 6 represent alternate implementations of the simplified computing device. As described below, any or all of these alternate implementations may be used in combination with other alternate implementations that are described throughout this document.

The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the BoB Selector implementations described herein, the device should have a sufficient computational capability and system memory to enable basic computational operations. In particular, the computational capability of the simplified computing device 600 shown in FIG. 6 is generally illustrated by one or more processing unit(s) 610, and may also include one or more graphics processing units (GPUs) 615, either or both in communication with system memory 620. The processing unit(s) 610 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 600 may also include other components, such as, for example, a network interface controller 630. The simplified computing device 600 may also include one or more conventional computer input devices 640 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 600 and with any other component or feature of the BoB Selector, including input, output, control, feedback, and response to one or more users or other devices or systems associated with the BoB Selector, are enabled by a variety of Natural User Interface (NUI) scenarios. The NUI techniques and scenarios enabled by the BoB Selector include, but are not limited to, interface technologies that allow one or more users user to interact with the BoB Selector in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 640 or system sensors 605. Such NUI implementations are also enabled by the use of various techniques including, but not limited to, information derived from system sensors 605 or other input devices 640 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the BoB Selector.

However, the aforementioned exemplary NUI scenarios may be further augmented by combining the use of artificial constraints or additional signals with any combination of NUI inputs. Such artificial constraints or additional signals may be imposed or generated by input devices 640 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the BoB Selector.

The simplified computing device 600 may also include other optional components such as one or more conventional computer output devices 650 (e.g., display device(s) 655, audio output devices, video output devices, devices for transmitting wired or wireless data transmissions, and the like). Typical network interface controllers (NICs) 630, input devices 640, output devices 650, and storage devices 660 for general-purpose computers are well known to those skilled in the art, and will not be described in detail herein.

The simplified computing device 600 shown in FIG. 6 may also include a variety of computer-readable media. Computer-readable media can be any available media that can be accessed by the computing device 600 via storage devices 660, and include both volatile and nonvolatile media that is either removable 670 and/or non-removable 680, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information or content delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various BoB Selector implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 625, hardware, or any combination thereof to control a computer to implement the disclosed subject matter. The term "article of manufacture" as used herein is intended to encompass a computer program accessible from any computer-readable device, or media.

The BoB Selector implementations described herein may be further described in the general context of computer-executable instructions, such as program modules, being executed by a computing device. Generally, program modules include routines, programs, objects, components, data structures, and the like, that perform particular tasks or implement particular abstract data types. The BoB Selector implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices.

Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the BoB Selector has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the BoB Selector. It is intended that the scope of the BoB Selector be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the BoB Selector described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A computer-implemented process, comprising:
receiving an arbitrary burst set comprising a plurality of images of a scene captured via an imaging device;
receiving a machine-learned predictive best of burst model;
the machine-learned predictive best of burst model automatically generated from a combination of features extracted from a plurality of training burst sets, each training burst set comprising a plurality of images of a scene, and corresponding human selections of a single subjective best image from each training burst set;
applying the machine-learned predictive best of burst model to rank each of the images in the arbitrary burst set in terms of a predicted subjective goodness level;
outputting a highest ranked one of the images of the arbitrary burst set as a predicted subjectively best image;
applying a global quality model to the images in the arbitrary burst set other than the predicted subjectively best image to produce a remainder set of images;
the remainder set of images comprising one or more images remaining after excluding one or more images having a predicted quality below a threshold level;
determining a difference level between the predicted subjectively best image and each of the images in the remainder set; and
outputting one or more of the highest ranked images in the remainder set for which the difference level exceeds a difference threshold level.

2. The computer-implemented process of claim 1, wherein applying the machine-learned predictive best of burst model to rank each of the images in the arbitrary burst set further comprises:
extracting a plurality of features from each of the images of the arbitrary burst set; and
applying the machine-learned predictive best of burst model to the extracted features and corresponding images to rank each of the images.

3. The computer-implemented process of claim 1, the human selections of the single subjective best image from each training burst set further comprising one or more hand-labeled annotation vectors that are applied in combination with the features extracted from the training burst sets and the corresponding human selections to automatically generate the machine-learned predictive best of burst model.

4. The computer-implemented process of claim 1, wherein the automatic generation of the machine-learned predictive best of burst model further comprises applying local ordinal regression to the combination of features and the corresponding human selections to learn the predictive best of burst model.

5. The computer-implemented process of claim 1, wherein the global quality model is automatically generated from a combination of features extracted from a plurality of arbitrary images and corresponding human subjective quality ratings of each of those arbitrary images.

6. A computer-readable storage device having computer-executable instructions stored thereupon which, when executed by a computer, cause the computer to:
receive a machine-learned predictive best of burst model, the predictive best of burst model automatically trained on a combination of features extracted from a plurality of training burst sets and corresponding human selections of a single subjective best image from each training burst set;
each training burst set comprising a plurality of images of a scene captured via an imaging device;
receive an arbitrary burst set comprising a plurality of images of a scene captured via an imaging device;
apply the machine-learned predictive best of burst model to rank each of the images in the arbitrary burst set in terms of a predicted subjective goodness level;
output a highest ranked one of the images in the arbitrary burst set as a predicted subjectively best image;
apply a global quality model to the images in the arbitrary burst set other than the predicted subjectively best image to produce a remainder set of images;
the remainder set of images comprising one or more images remaining after excluding one or more images having a predicted quality below a threshold level;
determine a difference level between the predicted subjectively best image and each of the images in the remainder set; and
output one or more of the highest ranked images in the remainder set having a difference level exceeding a difference threshold level.

7. The computer-readable storage device of claim 6, wherein applying the machine-learned predictive best of burst model to rank each of the images in the arbitrary burst set further comprises:
extracting a plurality of features from each of the images of the arbitrary burst set; and
applying the machine-learned predictive best of burst model to the extracted features and the corresponding images to rank each of the images.

8. The computer-readable storage device of claim 6, the human selections of the single subjective best image from each training burst set further comprising one or more hand-labeled annotation vectors that are applied in combination with the features extracted from the training burst sets and the corresponding human selections to automatically train the machine-learned predictive best of burst model.

9. The computer-readable storage device of claim 6, wherein the automatic training of the machine-learned predictive best of burst model further comprises applying local ordinal regression to the combination of features and the corresponding human selections to learn the predictive best of burst model.

10. The computer-readable storage device of claim 6, wherein the global quality model is automatically generated from a combination of features extracted from a plurality of arbitrary images and corresponding human subjective quality ratings of each of those arbitrary images.

11. A system, comprising:
a general-purpose computing device;
a computer-readable storage device; and a computer program, stored on the computer-readable storage device, comprising program modules executable by the computing device, wherein the computing device is directed by the program modules of the computer program to:
receive an arbitrary burst set comprising a plurality of images of a scene captured via an imaging device;
receive a machine-learned predictive best of burst model;
the machine-learned predictive best of burst model automatically generated from a combination of features extracted from a plurality of training burst sets, each training burst set comprising a plurality of images of a scene, and corresponding human selections of a single subjective best image from each training burst set;
apply the machine-learned predictive best of burst model to rank each of the images in the arbitrary burst set in terms of a predicted subjective goodness level;
output a highest ranked one of the images of the arbitrary burst set as a predicted subjectively best image;
apply a global quality model to the images in the arbitrary burst set other than the predicted subjectively best image to produce a remainder set of images;
the remainder set of images comprising one or more images remaining after excluding one or more images having a predicted quality below a threshold level;
determine a difference level between the predicted subjectively best image and each of the images in the remainder set; and
output one or more of the highest ranked images in the remainder set for which the difference level exceeds a difference threshold level.

12. The system of claim 11, wherein applying the machine-learned predictive best of burst model to rank each of the images in the arbitrary burst set further comprises:
extracting a plurality of features from each of the images of the arbitrary burst set; and
applying the machine-learned predictive best of burst model to the extracted features and corresponding images to rank each of the images.

13. The system of claim 11, the human selections of the single subjective best image from each training burst set further comprising one or more hand-labeled annotation vectors that are applied in combination with the features extracted from the training burst sets and the corresponding human selections to automatically generate the machine-learned predictive best of burst model.

14. The system of claim 11, wherein the automatic generation of the machine-learned predictive best of burst model further comprises applying local ordinal regression to the combination of features and the corresponding human selections to learn the predictive best of burst model.

15. The system of claim 11, wherein the global quality model is automatically generated from a combination of features extracted from a plurality of arbitrary images and corresponding human subjective quality ratings of each of those arbitrary images.

* * * * *